C. L. TROUT.
PLOW POINT ATTACHMENT.
APPLICATION FILED JULY 18, 1916.
1,205,416.
Patented Nov. 21, 1916.
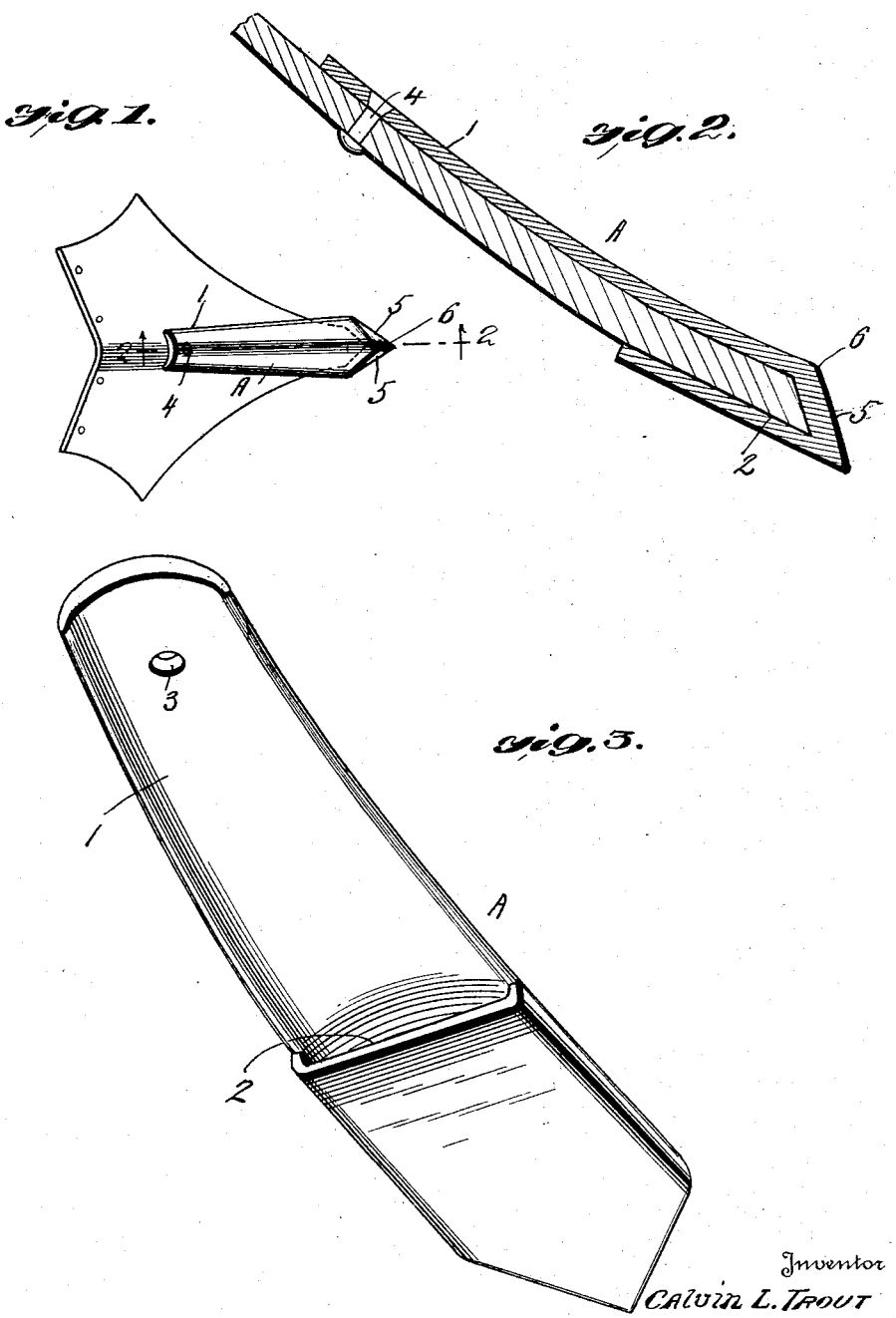
Inventor
CALVIN L. TROUT
By Milo B. Stevens & Co.
Attorneys

UNITED STATES PATENT OFFICE.

CALVIN L. TROUT, OF WELLINGTON, TEXAS.

PLOW-POINT ATTACHMENT.

1,205,416.  Specification of Letters Patent.  Patented Nov. 21, 1916.

Application filed July 18, 1916. Serial No. 109,876.

*To all whom it may concern:*

Be it known that I, CALVIN L. TROUT, a citizen of the United States, residing at Wellington, in the county of Collingsworth and State of Texas, have invented new and useful Improvements in Plow-Point Attachments, of which the following is a specification.

This invention relates to plow point attachments and it consists in the novel features hereinafter described and claimed.

An object of the invention is to provide an attachment of simple structure adapted to be applied to the point of a plow and which serves as a means for protecting the extremity of the plow point and the shin portion thereof from wear. The attachment may also be used to advantage on worn plow points. The attachment is especially adapted to be used on plows of the double mold board type as for instance middle breakers and similar plows which operate in the soil with a burrowing action, although the attachment may be used to advantage on other types of plow. It serves as a protector for the point and shin of the plow especially when the plow is used in sandy soil.

With these objects in view the attachment comprises a metallic body having a shank portion adapted to fit over the shin of a plow point, with means for securing the shank to the point. The body is provided with a pocket adapted to receive the extremity of the plow point and the body is provided at its upper side with converging surfaces which form a peak located behind the forward end of the body and approximately at the forward end of the pocket, the said peak constituting a projection of the body which enters the soil with a wedging action and facilitates the penetration of the same.

In the accompanying drawing: Figure 1 is a top plan view of a plow point with the attachment applied; Fig. 2 is an enlarged longitudinal sectional view of the same on the line 2—2 of Fig. 1, and Fig. 3 is a perspective view of the device removed from the share.

As shown in Fig. 1, of the drawing the attachment is illustrated applied to a point such as is generally used on a middle breaker plow. The attachment comprises a metallic body A having one end portion formed as a shank 1, and the other end portion provided with a pocket 2. The shank 1, is preferably curved at its under side to fit over the shin portion of a plow point and the pocket 2 is adapted to receive the extremity of the plow point when the attachment is applied. Thus the attachment completely covers and shields the point and shin of the plow and protects the same against wear when in use in the soil. The shank portion 1 is provided with a perforation 3 which may receive a bolt 4, and the said bolt may pass transversely through the plow point as shown in Fig. 2 and serve a means for securing the attachment in position on the plow point. The body is provided at its upper side and at its forward end with converging surfaces 5 which terminate at their upper extremities in a peak 6. The said peak is located behind the forward end of the body A and approximately at the forward end of the pocket 2. When the attachment is applied and in use the said peak serves as an entering wedge for penetrating the soil and this facilitating the penetration and lifting or moving of the soil notwithstanding the direct application of the attachment to the point of the plow.

From the foregoing description taken in conjunction with the accompanying drawing it will be seen that a plow point attachment of simple and durable structure is provided and that the same may be used to advantage for protecting the point of a plow and also to facilitate the tilling of the soil.

I claim:

A plow point attachment comprising a body having at its forward end a shank portion adapted to fit over the shin of a plow point, said body also having a pocket adapted to receive the extremity of the plow point, the said body also having its outer face composed of converging surfaces which form a wedge-shaped peak located behind the forward end of the body and approximately at the forward end of the pocket, and means for securing the attachment to the plow point.

In testimony whereof I affix my signature.

CALVIN L. TROUT.

Copies of this patent may be obtained for five cents each, by addressing the "Commissioner of Patents, Washington, D C."